United States Patent [19]
Chen

[11] Patent Number: 6,073,894
[45] Date of Patent: Jun. 13, 2000

[54] FOLDABLE LEG ASSEMBLY

[76] Inventor: Kao-San Chen, No. 282, Sec. 2, Shu-Lin St., Tainan City, Taiwan

[21] Appl. No.: 09/040,877

[22] Filed: Mar. 18, 1998

[51] Int. Cl.[7] .................................................. F16M 11/24
[52] U.S. Cl. ............................................ 248/165; 108/115
[58] Field of Search ................................ 211/181.1, 195, 211/201, 149; 108/115, 118; 248/165, 434, 164, 528, 529, 346.3, 436, 188.6, 440

[56] References Cited

U.S. PATENT DOCUMENTS

| | | | |
|---|---|---|---|
| 1,185,568 | 5/1916 | Zeunert | 108/115 |
| 1,552,479 | 9/1925 | Goldberg et al. | 248/436 |
| 3,136,272 | 6/1964 | Sprigman | 108/118 |
| 3,235,038 | 2/1966 | Nesslinger | 182/62.5 |
| 5,645,259 | 7/1997 | Chen | 248/436 |
| 5,765,248 | 6/1998 | Ono | 248/188.6 |
| 5,794,546 | 8/1998 | Carter | 108/115 |
| 5,913,270 | 6/1999 | Price | 108/101 |

Primary Examiner—Leslie A. Braun
Assistant Examiner—Kimberly Wood
Attorney, Agent, or Firm—Ladas & Parry

[57] ABSTRACT

A foldable leg assembly includes two upright first legs, two upright second legs, and two upright third legs which are disposed in three rows such that the row of the second legs is disposed intermediate of the rows of the first and third legs. A plurality of pairs of foldable intersecting links interconnect the first, second and third legs. In the unfolded state of the leg assembly, a first support rail bridges horizontally and transversely top ends of the first legs, a second support rail bridges horizontally and transversely top ends of the second legs, and a pair of third support rails bridge horizontally and longitudinally top ends of the second legs and top ends of the corresponding third legs. The support rails are turnable pivotally and downwardly relative to top ends of the corresponding one of the first, second and third legs so as to be substantially vertical in the folded state of the leg assembly.

8 Claims, 7 Drawing Sheets

FOLDABLE LEG ASSEMBLY

BACKGROUND OF THE INVENTION

1. Field of the Invention

The present invention relates to a foldable leg assembly, more particularly to a foldable leg assembly which is easy to fold and unfold, and which is convenient to carry when folded.

2. Description of the Related Art

Conventional foldable leg assemblies generally include four legs to permit placing of either a table top or a burner thereon. Although foldable leg assemblies which permit placing of both a table top and a burner thereon after being unfolded have been developed, they suffer from the drawbacks of difficulty in assembly and inconvenience in transport since the components thereof are easily scattered and are not well-connected.

SUMMARY OF THE INVENTION

The main object of the present invention is to provide a foldable leg assembly which includes well-connected components, which is easy to fold and unfold, and which is convenient to carry when folded.

Accordingly, the foldable leg assembly of the present invention includes a pair of upright first legs, a pair of upright second legs, and a pair of upright third legs which are disposed in three rows such that the second legs are arranged in one of the rows intermediate of the rows of the first and third legs. A plurality of pairs of foldable intersecting links, which are connected pivotally to each other, interconnect the first, second and third legs. A first support rail has one end pivoted to a top end of one of the first legs so as to turn downward substantially vertically in a folded state of the foldable leg assembly, and has another end to extend to a top end of another one of the first legs so as to establish a horizontal bridge between the first legs in an unfolded state of the foldable leg assembly. A second support rail has one end pivoted to a top end of one of the second legs so as to turn downward substantially vertically in the folded state of the foldable leg assembly, and has another end to extend to a top end of another one of the second legs so as to establish a horizontal bridge between the second legs in the unfolded state of the foldable leg assembly. The foldable leg assembly further includes a pair of third support rails, each of which has one end pivoted to a top end of a respective one of the third legs so as to turn downward substantially vertically in the folded state of the foldable leg assembly, and another end to extend to a top end of a corresponding one of the second legs so as to establish a horizontal bridge between the corresponding second and third legs in the unfolded state of the foldable leg assembly.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

Figure 1:
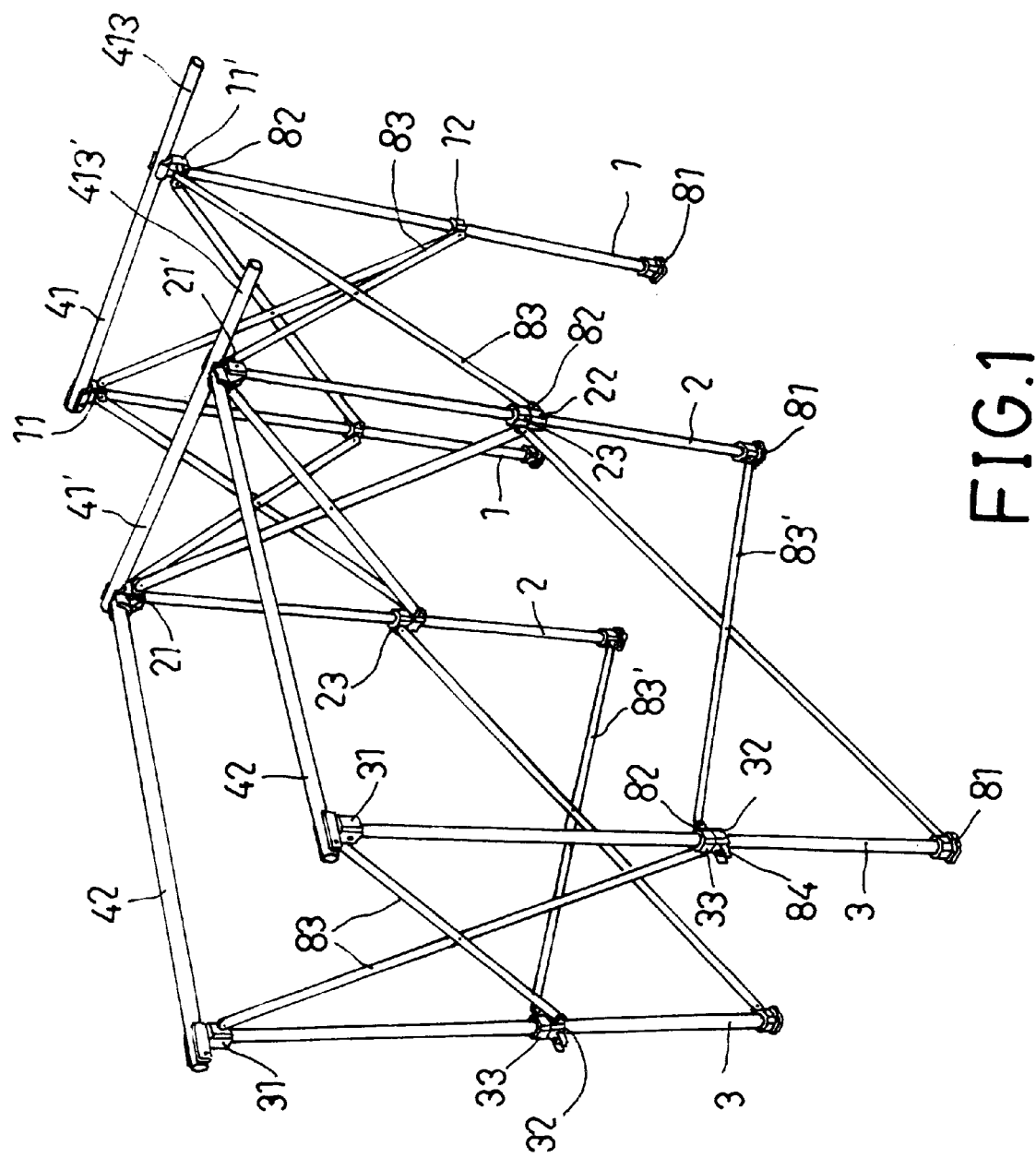
FIG. 1 is a perspective view of a preferred embodiment of the foldable leg assembly of the present invention in an unfolded state.

FIG. 1 illustrates the preferred embodiment of the foldable leg assembly according to the present invention in an unfolded state. The foldable leg assembly includes a pair of upright first legs 1, a pair of upright second legs 2, and a pair of upright third legs 3 which are disposed in three rows such that the second legs 2 are arranged in one of the rows intermediate of the rows of the first and third legs 1, 3. Each of the first, second and third legs 1, 2, 3 has a bottom end provided with a foot member 81, and is provided with a lower sliding block 12, 22, 32 which is sleeved slidably thereon between the foot member 81 and a top end thereof. Each of the second and third legs 2, 3 is further provided with an upper sliding block 23, 33 between the corresponding top end and the corresponding lower sliding block 22, 32. A plurality of pairs of upper and lower foldable intersecting links 83, 83' are provided between adjacent pairs of the first, second and third legs 1, 2, 3 to interconnect foldably the first, second and third legs 1, 2, 3. In the unfolded state of the foldable leg assembly shown in FIG. 1, a first support rail 41 extends between the top ends of the first legs 1 to establish a transverse horizontal bridge between the first legs 1. A second support rail 41' parallel to the first support rail 41 extends between the top ends of the second legs 2 to establish a transverse horizontal bridge between the second legs 2. A parallel pair of third support rails 42 extend between the top ends of the third legs 3 and the top ends of the corresponding second legs 2 in a direction perpendicular to the first and second support rails 41, 41' to establish a pair of longitudinal horizontal bridges between the corresponding second and third legs 2, 3.

Figure 3:
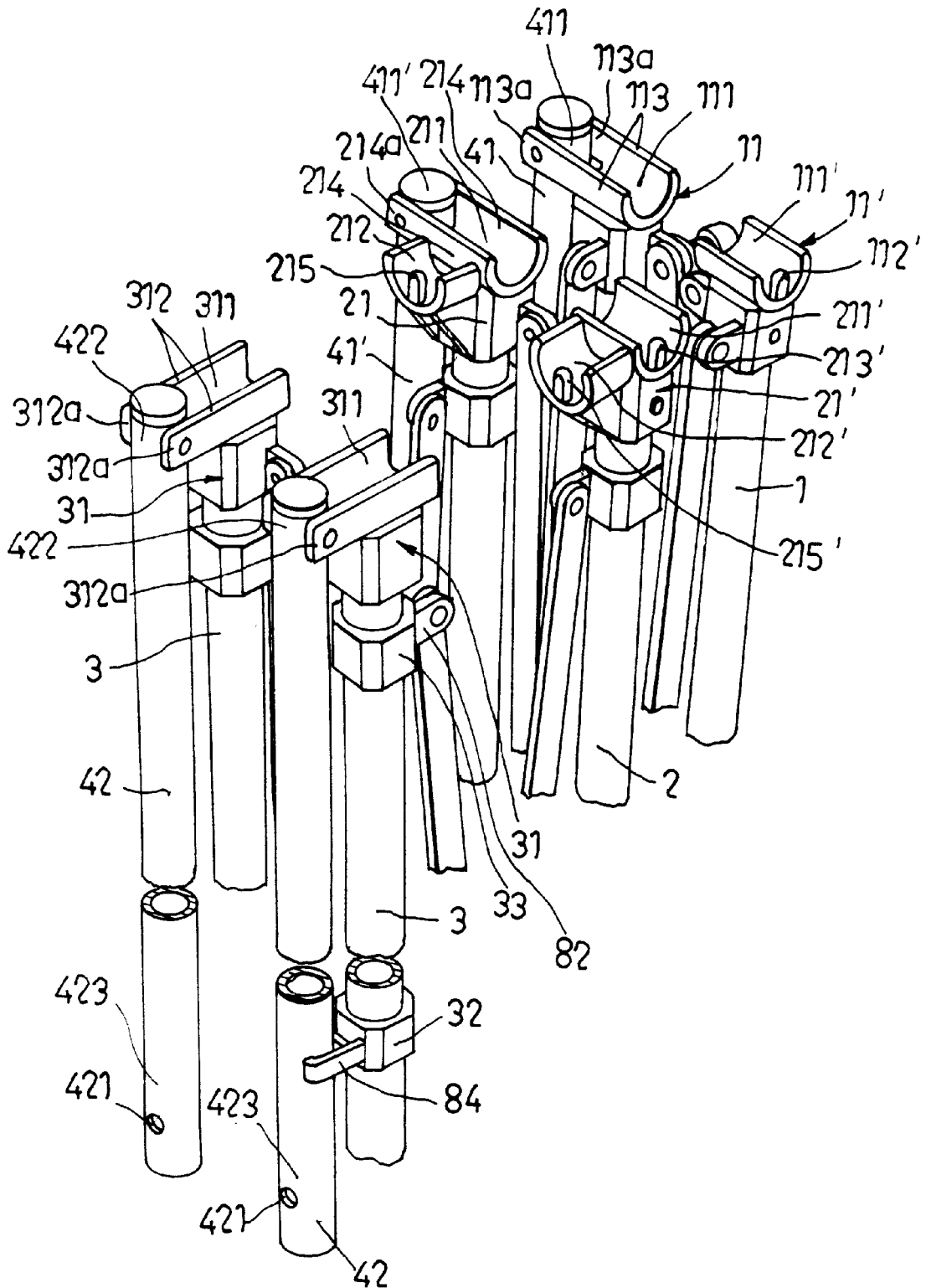
FIG. 3 is a partly perspective view illustrating the preferred embodiment when it is in a substantially folded state.

Referring to FIGS. 1 and 3, the top end of the rear one of the first legs 1 is provided with a fixed first seat 11. The top end of the rear one of the second legs 2 is provided with a fixed second seat 21. The top end of each of the third legs 3 is provided with a fixed third seat 31. The top end of the front one of the first legs 1 is provided with a fixed fourth seat 11'. The top end of the front one of the second legs 2 is provided with a fixed fifth seat 21'. A plurality of pivot lobes 82 are provided on the seats 11, 21, 31, 11', 21' on the upper and lower sliding blocks 12, 22, 32, 23, 33 and on the foot members 81 of the second and third legs 2, 3. The pairs of the upper intersecting links 83 are provided between adjacent pairs of the first and second legs 1, 2 and between the third legs 3. Each of the pairs of the upper intersection links 83 has two upper connecting ends connected pivotally to the pivot lobes 82 formed on the corresponding two of the seats 11, 21, 31, 11', 21' so as to be prevented from sliding along the corresponding two of the legs 1, 2, 3, two lower connecting ends connected pivotally to the pivot lobes 82 formed on the corresponding two of the lower sliding blocks 12, 22, 32 so as to be slidable along the corresponding two of the legs 1, 2, 3, and intermediate sections pivoted foldably to each other. The pairs of the lower intersecting links 83' are provided between the third legs 3 and the corresponding second legs 2 for interconnecting foldably the second and third legs 2, 3. Each of the pairs of the lower intersecting links 83' has two upper connecting ends connected pivotally to the pivot lobes 82 formed on the corresponding two of the upper sliding blocks 23, 33 so as to be slidable along the corresponding two of the legs 2, 3, two lower connecting ends connected pivotally to the pivot lobes 82 formed on the corresponding two of the foot members 81 so as to be prevented from sliding along the corresponding two of the legs 2, 3, and intermediate sections pivoted foldably to each other.

The first seat 11 includes two upwardly extending opposite walls 113 that confine a first receiving groove 111 and that project in part outwardly of the first receiving groove 111 to form a pair of pivot plates 113a which sandwich a first end 411 of the first support rail 41 to establish a pivotal connection therewith such that the first support rail 41 is able to turn downward in a substantially vertical orientation in the folded state of the foldable leg assembly and to turn upward in a substantially horizontal orientation to establish the horizontal bridge between the first legs 1, as shown in FIG. 1. The second seat 21 includes two upwardly extending opposite second walls 214 which confine a second receiving groove 211 and which project in part outwardly of the second receiving groove 211 to form a pair of pivot plates 214a that sandwich a first end 411' of the second support rail 41' to establish a pivotal connection therewith. The second seat 21 further includes a channel member 212 which extends from one of the second walls 214 outwardly of the second receiving groove 211 in a direction substantially perpendicular to said one of the second walls 214 and toward the corresponding one of the third legs 3. The channel member 212 is formed with an upward pin 215 therein. Each of the third seats 31 includes two upwardly extending opposite third walls 312 that confine a third receiving groove 311 and that project in part outwardly of the third receiving groove 311 to form a pair of pivot plates 312a that sandwich a first end 422 of a corresponding one of the third legs 42 to establish a pivotal connection therewith. The fourth seat 11' has a channel member 111' and an upward pin 112' formed in the channel member 111'. The fifth seat 21' has a channel member 211' and an upward pin 213' formed in the channel member 211'. The fifth seat 21' further has a channel member 212' which extends outwardly of the channel member 211' in a direction substantially perpendicular to the channel member 211' and toward the corresponding one of the third legs 3. The channel member 212' is formed with an upward pin 215' therein. Each of the first, second and third support rails 41, 41', 42 is formed with a pin hole (only the pin holes 421 of the third support rails 42 are shown in FIG. 3). The lower sliding blocks 12, 22, 32 on the rear one of the first legs 1, the rear one of the second legs 2, and the third legs 3 are each formed with a pair of clamping jaws 84 (only one is shown in FIG. 3).

When the foldable leg assembly is in the folded state, the first, second and third support rails 41, 41', 42 turn downward to be substantially vertical so that the support rails 41, 41', 42 can be retained by the clamping jaws 84 formed on the corresponding ones of the lower sliding blocks 12, 22, 32 adjacent to the support rails 41, 41', 42.

When the foldable leg assembly is in the unfolded state shown in FIG. 1, the first, second and third support rails 41, 41', 42 turn upwardly to be substantially horizontal so as to bridge the top ends of the first, second and third legs 1, 2, 3. The receiving groove 111 of the first seat 11 supports the first end 411 of the first support rail 41. The channel member 111' of the fourth seat 11' supports a second end of the first support rail 41 opposite to the first end 411. The pin hole (not shown) formed in the first support rail 41 engages the upward pin 112' in order to retain the first support rail 41. The first support rail 41 has a front end section 413 projecting forwardly relative to the fourth seat 11'. The receiving groove 211 supports the first end 411' of the second support rail 41'. The channel member 211' of the fifth seat 21' supports a second end of the second support rail 41' opposite to the first end 411'. The pin hole (not shown) formed in the second support rail 41' engages the upward pin 213' in order to retain the second support rail 41'. The second support rail 41' has a front end section 413' projecting forwardly relative to the fifth seat 21'. The receiving groove 311 of each of the third seats 31 supports the first end 422 of a respective one of the third support rails 42. Each of the channel members 212, 212' supports a second end 423 of a respective one of the third support rails 42 opposite to the first end 422. The pin hole 421 formed in each of the third support rail 42 engages the upward pin 215, 215' formed in a corresponding one of the channel members 212, 212' in order to retain the third support rails 42.

Figure 2:
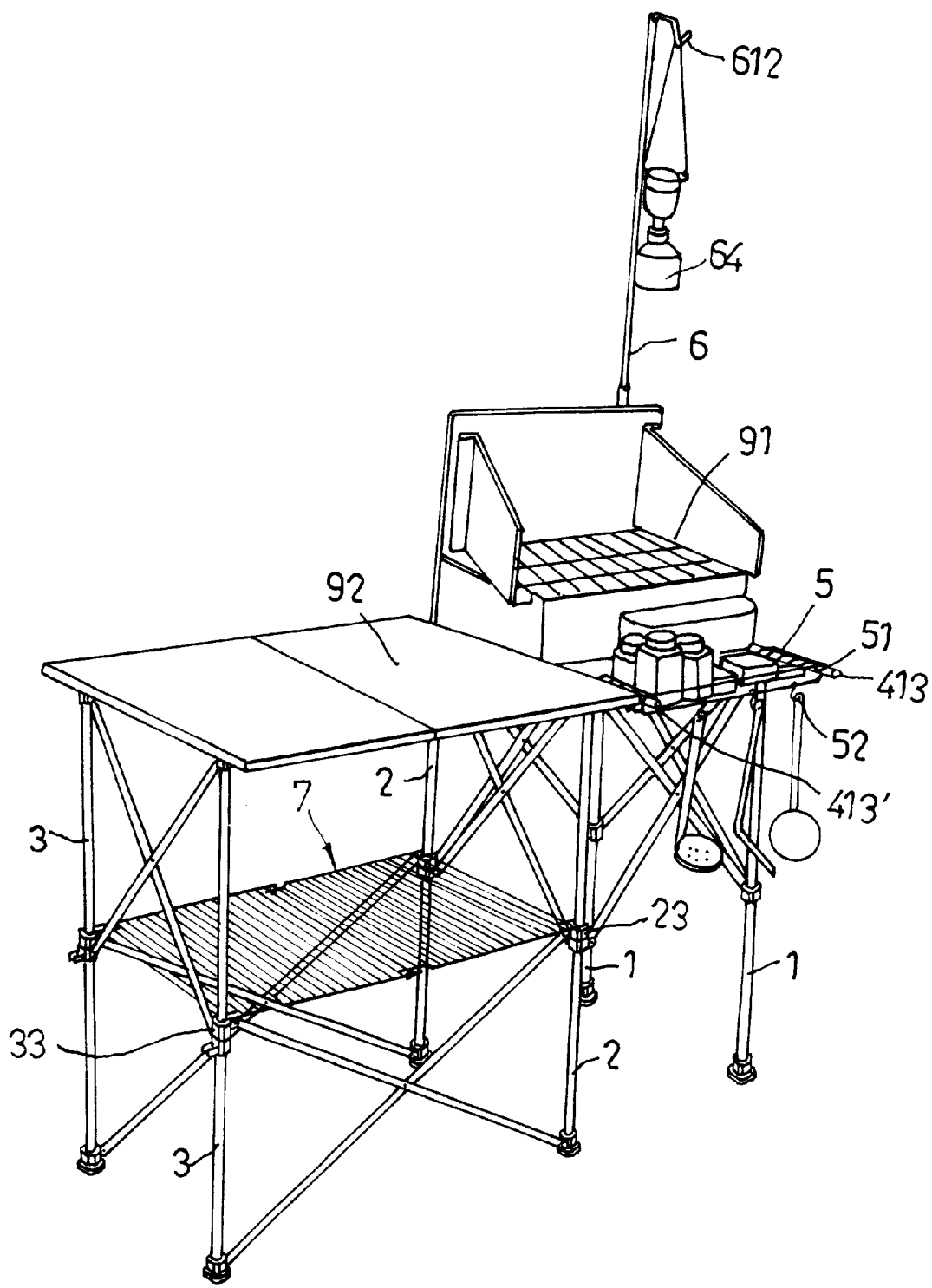
FIG. 2 is a perspective view illustrating the preferred embodiment of the present invention when in use.

Referring to FIGS. 1 and 2, after the foldable leg assembly of the present embodiment has been erected in the unfolded state, a burner 91 can be placed over and across the first and second support rails 41, 41', a carrier rack 5 may be hung on the projecting end sections 413, 413' of the first and second support rails 41, 41', and a foldable table top 92 may be placed over and across the pair of third support rails 42. Preferably, the support rails 41, 41', 42 may be provided with known clamping devices (not shown) for retaining the burner 91 and the table top 92 thereon.

The carrier rack 5 has two opposite sides 51 hooked at the projecting end sections 413, 413', an indented middle portion to permit placing of objects, such as bottles, thereon, and a front side provided with a number of hook members 52 for hooking cooking utensils, such as ladles, thereat.

Figure 4:
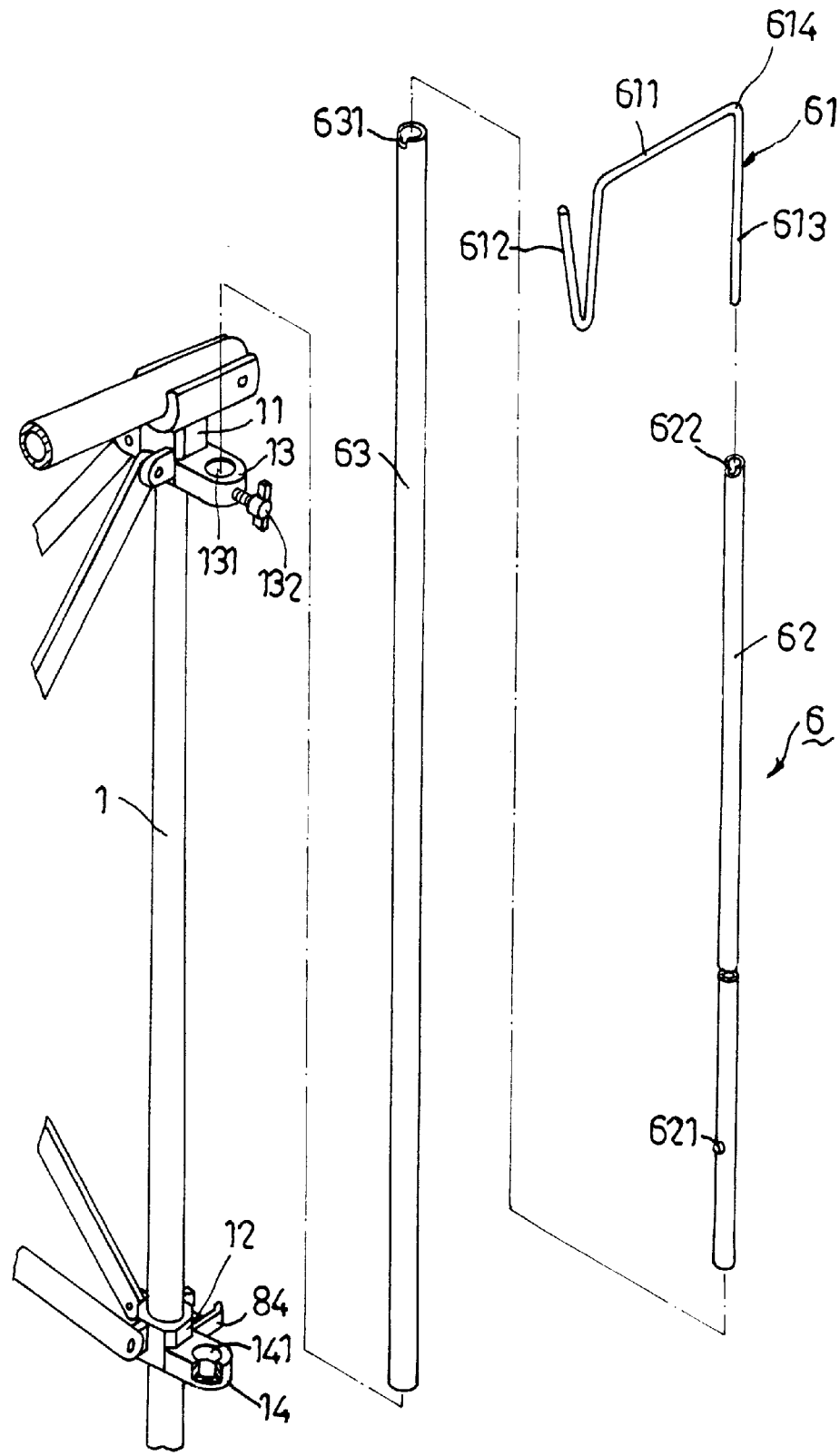
FIG. 4 is a perspective view illustrating how a hanging rod is mounted on the foldable leg assembly of the preferred embodiment.

Referring to FIGS. 2 and 4, when the foldable leg assembly of the present embodiment is unfolded, an upright hanging rod 6 may be mounted on the rear one of the first legs 1 for hanging a lamp 64 thereon. The hanging rod 6 includes a tubular lower rod member 63, a tubular middle rod member 62 inserted into the lower rod member 63, and an upper rod member 61 inserted into the middle rod member 62. The upper rod member 63 has a cross-section smaller than that of the middle rod member 62 which, in turn, has a cross-section smaller than that of the lower rod member 63. The lower rod member 63 has an upper end formed with an engaging slot 631. The middle rod member 62 has a lower portion formed with a radial protrusion 621, and an upper end formed with an engaging groove 622. The upper rod member 61 includes a vertical section 613, a generally horizontal section 611 extending from a top end of the vertical section 613 and forming a bent corner 614 with the vertical section 613, and a hooked section 612 extending from the generally horizontal section 611. The first seat 11 on the rear one of the first legs 1 is formed with an upper positioning block 13 that has a vertical positioning hole 131 formed therethrough and that is provided with a regulating lever 132 which is extendible threadedly and radially into said positioning hole 131. The lower sliding block 12 on the rear one of the first legs 1 is formed with a lower positioning block 14 which has a recess 141 that opens upward. Assembly of the upright hanging rod 6 to the rear one of the first legs 1 is conducted in the following manner: The vertical section 613 of the upper rod member 61 is inserted into the middle rod member 62 from a top end of the middle rod member 62 such that the bent corner 614 engages the engaging groove 622 so as to position the upper rod member 61 and to prevent axial rotation of the upper rod member 61 relative to the middle rod member 62. The middle rod member 62 is inserted into the lower rod member 63 from a top end of the latter so that the radial protrusion 621 of the middle rod member 62 engages the engaging slot 631 of the lower rod member 63. The middle rod member 62 is thus positioned on the lower rod member 63 and is prevented from rotation relative to the lower rod member 63. The lower rod member 63 is then extended through the positioning hole 131 so that a bottom end of the lower rod member 63 is received in the recess 141. The regulating lever 132 is turned to extend threadedly into the positioning hole 131 and to abut tightly against the lower rod member 63 in order to position the lower rod member 63 and to prevent axial rotation of the lower rod member 63 in the positioning hole 131. Assembly of the upright hanging rod 6 to the rear one of the first legs 1 is thus completed. Thereafter, a lamp 64 may be hung on the hooked section 612 for illuminating purposes.

Figure 5:
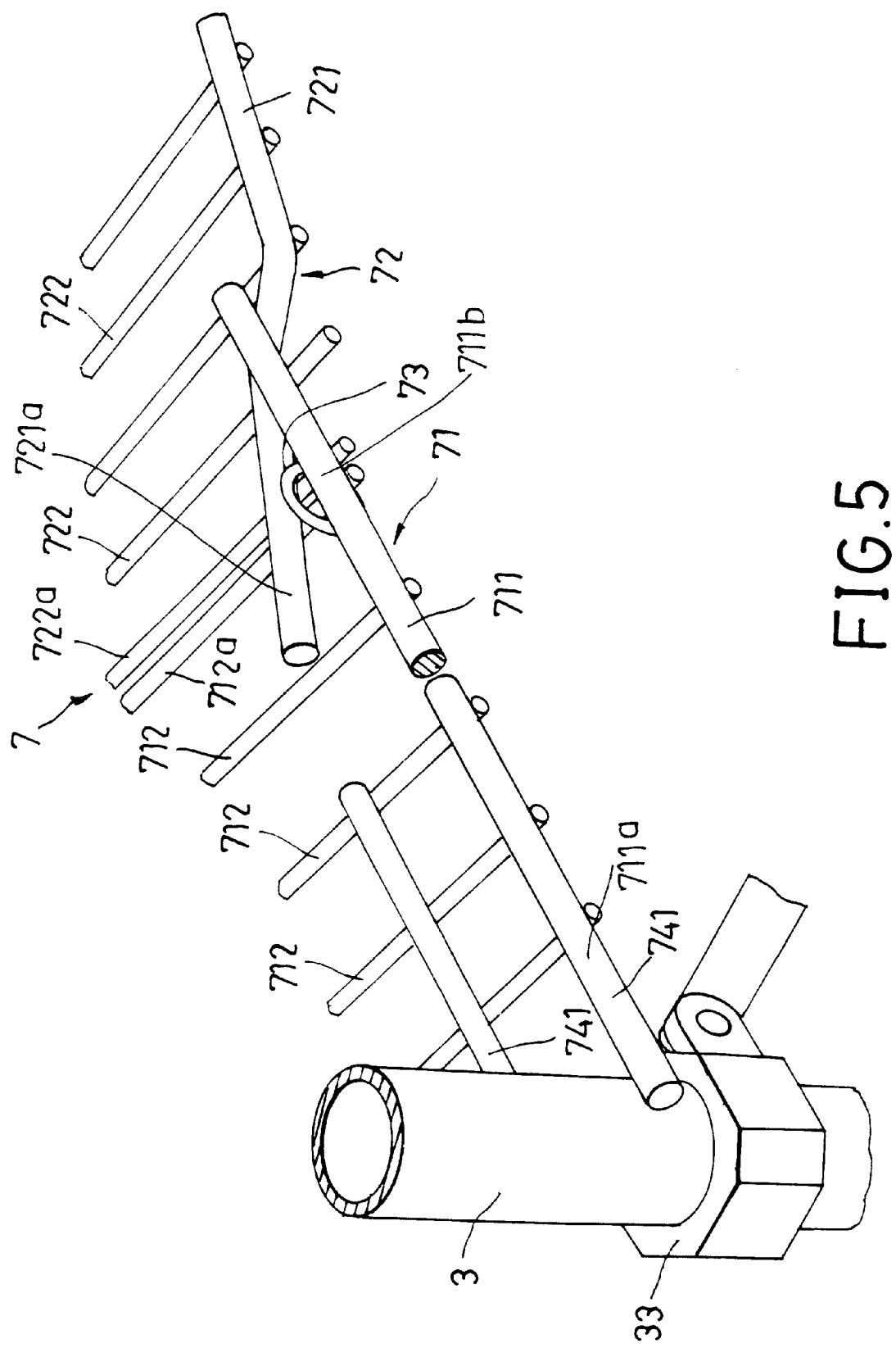
FIG. 5 is a partly perspective view illustrating how a flat partition rack is mounted on the foldable leg assembly of the preferred embodiment.

Referring to FIGS. 2 and 5, after the foldable leg assembly has been unfolded for use, a flat partition rack 7 may be mounted between the second and third legs 2, 3. The flat partition rack 7 includes first and second rack members 71, 72 which are connected pivotally and foldably to one another. The flat partition rack 7 has four forked corners 741 engaging the second and third legs 2, 3, respectively, and disposed on upper surfaces of the corresponding upper sliding blocks 23, 33, respectively, for resting the flat partition rack 7 on the upper sliding blocks 23., 33 and for retaining the flat partition rack 7 between the second and third legs 2, 3. Each of the first and second rack members 71, 72 includes a pair of longitudinal rods 711, 721, and a plurality of transverse rods 712, 722 extending between the longitudinal rods 711, 721. The longitudinal rods 711 of the first rack member 71 have first end portions 711a extending to the third legs 3, respectively, and opposite second end portions 711b extending toward the second rack member 72. The longitudinal rods 721 of the second rack member 72 have third end portions 721a overlapping the second end portions 711b, and opposite fourth end portions (not shown in FIG. 5) extending toward the second legs 2. Each of the third end portions 721a is bent to form an offset part substantially in parallel with the corresponding one of the second end portions 711b. The partition rack 7 further includes a pair of coupling rings 73 (only one is shown in FIG. 5), each being disposed between the corresponding offset part 721a and the corresponding second end portion 711b and each being sleeved on the two adjacent transverse rods 712a, 722a of the first and second rack members 71, 72 to permit relative turning movement of the first and second rack members 71, 72 for folding and unfolding the partition rack 7. When the flat partition rack 7 is to be mounted between the second and third legs 2, 3, the partition rack 7 is brought between the second and third legs 2, 3 in a substantially folded state and is then unfolded thereat so that the four forked corners 741 engage the second and third legs 2, 3 and rest on the corresponding upper sliding blocks 23, 33, respectively.

The provision of the partition rack 7 between the second and third legs 2, 3, and the carrier rack 5 between the first and second support rails 41, 41' results in added stability to the foldable leg assembly in the unfolded state.

Figure 6:
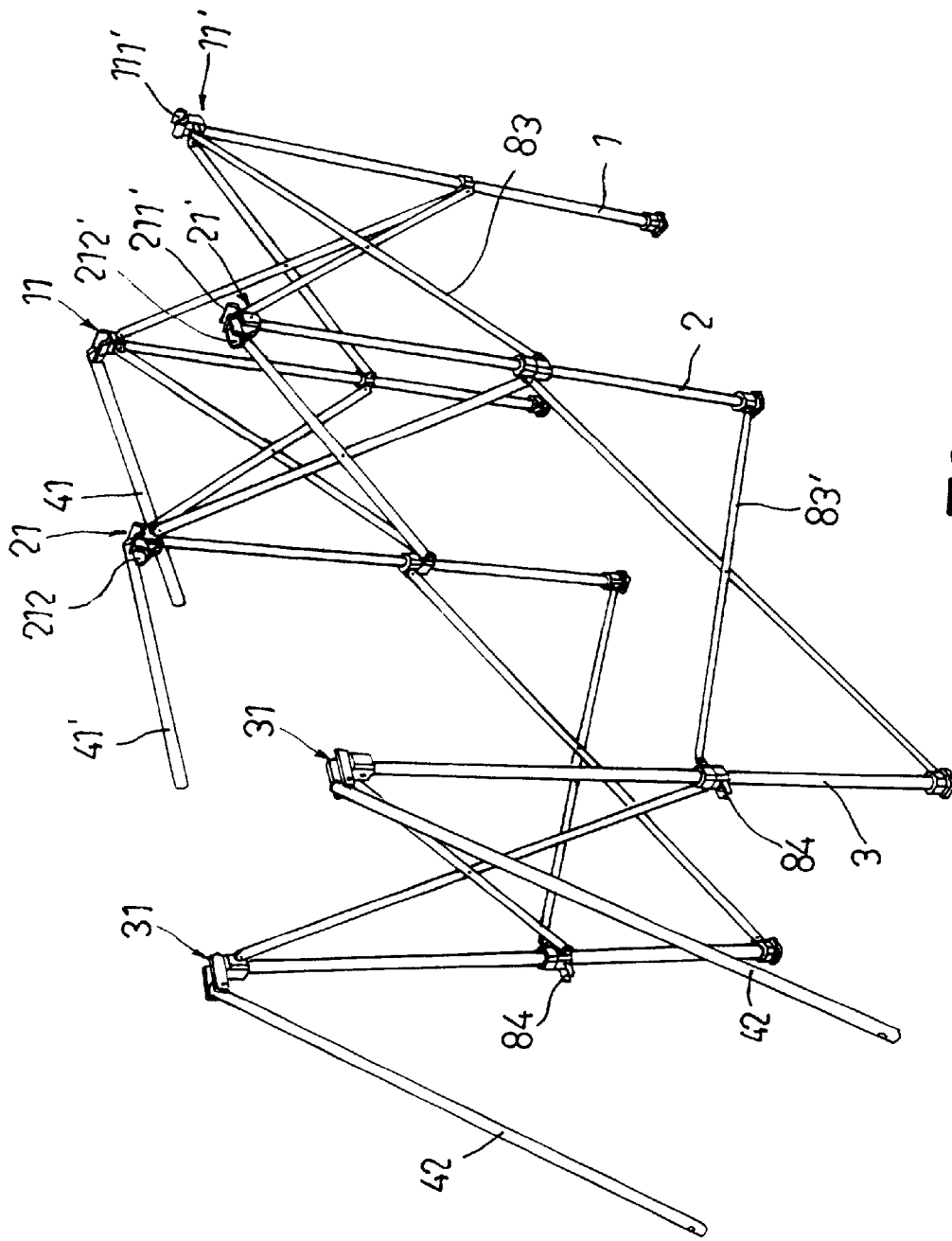
FIG. 6 is a perspective view illustrating how the foldable leg assembly is folded.
Figure 7:
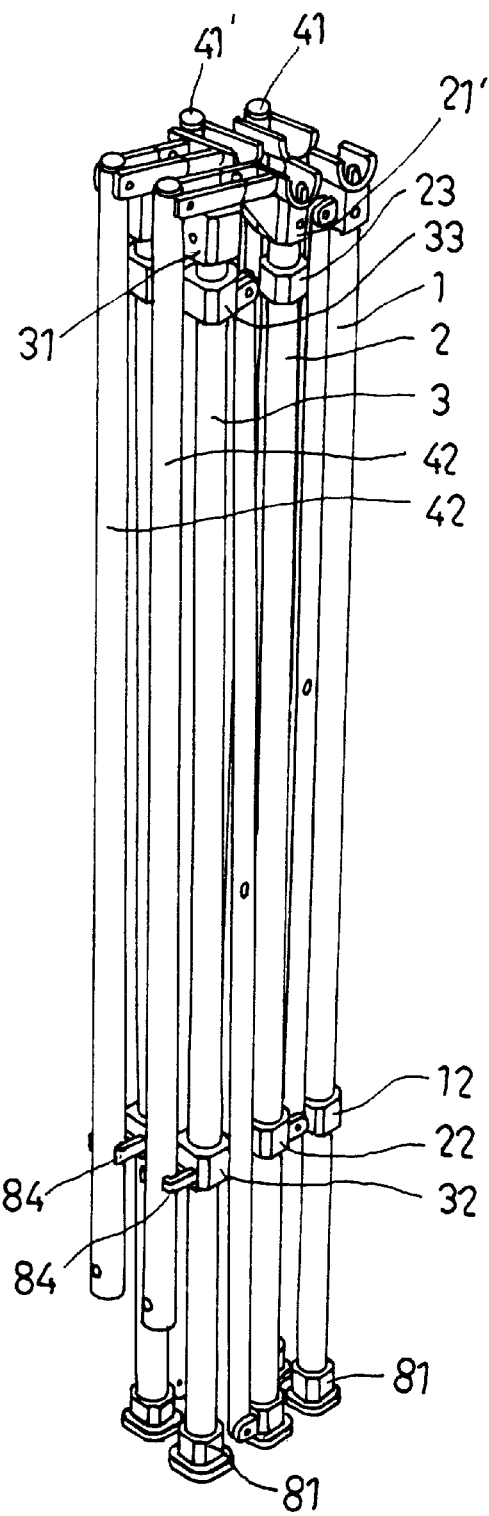
FIG. 7 is a perspective view of the foldable leg assembly in a folded state.

When the foldable leg assembly is to be folded after use, the burner 91, the table top 92, the carrier rack 5, the flat partition rack 7 and the hanging rod 6, together with the lamp 64 on the hanging rod 6, are first removed from the leg assembly. Thereafter, the second ends of the first, second and third support rails 41, 41', 42 are removed from the corresponding one of the channel members 111', 211', 212, 212', and are turned about the corresponding one of the first, second and third seats 11, 21, 31, as shown in FIG. 6, until the first, second and third support rails 41, 41', 42 extend substantially vertically and downwardly from the corresponding one of the first, second and third seats 11, 21, 31 so that the second ends of the support rails 41, 41', 42 are retained by the corresponding clamping jaws 84. The upper and lower intersecting links 83, 83' are folded to move the first, second and third legs 1, 2, 3 closely to one another, as shown in FIG. 7, thereby completing folding of the leg assembly. When the upper and lower intersecting links 83, 83' are folded, the upper sliding blocks 23, 33 move upward toward the corresponding ones of the second, third and fifth seats 21, 31, 21', and the lower sliding blocks 12, 22, 32 move downward toward the corresponding ones of the foot members 81 of the legs 1, 2, 3.

Accordingly, the foldable leg assembly of the present invention includes components which are well connected to one another. As such, folding and unfolding of the foldable leg assembly of the present invention can be easily conducted without scattering any of the components. Moreover, since the support rails 41, 41', 42 can be retained by the clamping jaws 84 in the folded state of the leg assembly, the leg assembly is relatively convenient to carry when folded..

With this invention thus explained, it is apparent that numerous modifications and variations can be made without departing from the scope and spirit of this invention. It is therefore intended that this invention be limited only as indicated in the appended claims.

I claim:

1. A foldable leg assembly comprising:

a pair of upright first legs, a pair of upright second legs, and a pair of upright third legs which are disposed in three rows such that said second legs are arranged in one of said rows intermediate of said rows of said first and third legs;

a plurality of pairs of foldable intersecting links which are connected pivotally to each other, said pairs of intersecting links interconnecting said first, second and third legs;

a first support rail having one end pivoted to a top end of one of said first legs so as to turn downward substantially vertically in a folded state of the foldable leg assembly, and having another end to extend to a top end of another one of said first legs so as to establish a horizontal bridge between said first legs in an unfolded state of the foldable leg assembly;

a second support rail having one end pivoted to a top end of one of said second legs so as to turn downward substantially vertically in the folded state of said foldable leg assembly, and having another end to extend to a top end of another one of said second legs so as to establish a horizontal bridge between said second legs in the unfolded state of the folded leg assembly;

a pair of third support rails, each of which has one end pivoted to a top end of a respective one of said third legs so as to turn downward substantially vertically in the folded state of said foldable leg assembly, and another end to extend to a top end of a corresponding one of said second legs so as to establish a horizontal bridge between said corresponding second and third legs in the unfolded state of said foldable leg assembly; and a plurality of sliding blocks slidably disposed on said first, second and third legs, each of said pairs of said intersecting links having a pair of upper connecting ends and a pair of lower connecting ends to connect with two corresponding ones of said first, second and third legs, one of said pairs of said upper and lower connecting ends being prevented from sliding along said two corresponding ones of said first, second and third legs, the other one of said pairs of said upper and lower connecting ends being connected slidably to two corresponding ones of said sliding blocks, each of said second and third legs having a pair of said sliding blocks disposed thereon one above the other, the upper one of said pair of said sliding blocks being pivotally connected to the corresponding one of said upper connecting ends of an adjacent pair of said intersecting links, the lower one of said pair of said sliding blocks being pivotally connected to the corresponding one of said lower connecting ends of another adjacent pair of said intersecting links.

2. The foldable leg assembly according to claim 1, wherein at least one of said sliding blocks is formed with a pair of clamping jaws for retaining said another end of one of said first, second and third support rails in the folded state of said foldable leg assembly.

3. The foldable leg assembly according to claim 1, further comprising a flat partition rack disposed between said second and third legs and resting on the upper one of the sliding blocks, said partition rack including a first rack member and a second rack member connected pivotally and foldably to one another, said flat partition rack having four forked corners engaging said second and third legs, respectively, for retaining said flat partition rack between said second and third legs.

4. The foldable leg assembly according to claim 3, wherein each of said first and second rack members includes a parallel pair of longitudinal rods and a plurality of transverse rods extending between said longitudinal rods, said longitudinal rods of said first rack member having first end portions extending to said third legs, respectively, and opposite second end portions extending toward said second rack member, said longitudinal rods of said second rack member having third end portions overlapping said second end portions, and opposite fourth end portions extending toward said second legs, each of said third end portions being bent to form an offset part substantially in parallel with the corresponding one of said second end portions, said partition rack further including a pair of coupling rings, each being disposed between the corresponding offset part and the corresponding second end portion, and each being sleeved on the two adjacent transverse rods of said first and second rack members to permit relative turning movement of said first and second rack members.

5. The foldable leg assembly according to claim 1, wherein said top end of one of said first legs is provided with a first seat which includes two upwardly extending opposite first walls that confine a first receiving groove and that project in part outwardly of said first receiving groove to sandwich said one end of said first support rail to establish a pivotal connection therewith, said first receiving groove supporting said one end of said first support rail in the unfolded state of said foldable leg assembly.

6. The foldable leg assembly according to claim 1, wherein said top end of one of said second legs has a second seat that includes two upwardly extending opposite second walls which confine a second receiving groove and which project in part outwardly of said second receiving groove to sandwich said one end of said second support rail to establish a pivotal connection therewith, and a channel member which extends from one of said second walls outwardly of said second receiving groove in a direction substantially perpendicular to said one of said second walls, said second receiving groove supporting said one end of said second support rail in the unfolded state of said foldable leg assembly, said channel member supporting said another end of the corresponding one of said third support rails in the unfolded state of said foldable leg assembly.

7. The foldable leg assembly according to claim 6, wherein said channel member is formed with an upward pin, said corresponding one of said third support rails being formed with a pin hole for engaging said upward pin when said foldable leg assembly is in the unfolded state.

8. The foldable leg assembly according to claim 1, wherein said top end of each of said third legs has a third seat which includes two upwardly extending opposite third walls that confine a third receiving groove and that project in part outwardly of said third receiving groove to sandwich said one end of the corresponding one of said third support rails to establish a pivotal connection therewith, said third receiving groove supporting said one end of said corresponding third support rail in the unfolded state of said foldable leg assembly.

\* \* \* \* \*